US008325188B1

(12) United States Patent
Phillips et al.

(10) Patent No.: US 8,325,188 B1
(45) Date of Patent: Dec. 4, 2012

(54) METHOD AND SYSTEM FOR IMPLEMENTING A WAVEFORM VIEWER

(75) Inventors: Joel R. Phillips, Oakland, CA (US);
Sherry Solden, Palo Alto, CA (US);
Henry C. Chang, Sunnyvale, CA (US);
Kenneth S. Kundert, Los Altos, CA (US); Ted Vucurevich, Los Gatos, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 939 days.

(21) Appl. No.: 11/490,838

(22) Filed: Jul. 21, 2006

Related U.S. Application Data

(60) Provisional application No. 60/702,056, filed on Jul. 21, 2005.

(51) Int. Cl.
*G06T 17/00* (2006.01)
(52) U.S. Cl. ..................................... 345/428; 345/440.1
(58) Field of Classification Search .................. 345/428, 345/440.1
See application file for complete search history.

(56) References Cited

U.S. PATENT DOCUMENTS

| | | | | |
|---|---|---|---|---|
| 5,528,356 A | * | 6/1996 | Harcourt | 356/73.1 |
| 6,459,256 B1 | * | 10/2002 | Pickerd | 324/121 R |
| 6,584,442 B1 | * | 6/2003 | Suzuki et al. | 704/500 |
| 7,448,010 B1 | | 11/2008 | Lenahan et al. | |
| 2002/0183998 A1 | * | 12/2002 | Shakeri et al. | 703/22 |
| 2003/0212938 A1 | * | 11/2003 | Sutton | 714/724 |
| 2004/0044534 A1 | * | 3/2004 | Chen et al. | 704/501 |
| 2004/0069118 A1 | * | 4/2004 | Okazaki et al. | 84/603 |
| 2004/0148578 A1 | * | 7/2004 | McConaghy et al. | 716/1 |
| 2004/0243372 A1 | * | 12/2004 | Tester | 703/14 |

OTHER PUBLICATIONS

Lenhan, T. et al. U.S. Appl. No. 10/909,059, filed Jul. 30, 2004.
Noice, D. et al. U.S. Appl. No. 11/407,873, filed Apr. 19, 2006.
Noice, D. et al. U.S. Appl. No. 11/069,759, filed Feb. 28, 2005.

* cited by examiner

*Primary Examiner* — Maurice L McDowell, Jr.
(74) *Attorney, Agent, or Firm* — Vista IP Law Group, LLP

(57) ABSTRACT

Systems and methods for storing waveform data and outputting data to a waveform viewer are disclosed. A waveform is segmented into a plurality of segments, and data describing each segment is stored at several levels of resolution. When a user wishes to view a portion of the waveform, the appropriate segments of the waveform are identified, and the appropriate levels of resolution are selected. The data describing the appropriate segments at the appropriate levels of resolution are output to a waveform viewer. An index may be provided to aid in selection of the appropriate data. Various methods for compression of the data are also supported.

42 Claims, 9 Drawing Sheets

Fig. 7

| maxs |   | 2 |   | 4 |   |   | 7 | 8 |   | 10 |    |    |    |    |
|------|---|---|---|---|---|---|---|---|---|----|----|----|----|----|
| mins |   |   | 3 |   | 5 | 6 |   |   | 9 |    |    |    |    |    |
| $S_n$ | 1 |   |   |   | 5 |   |   |   | 9 |    |    |    |    | 15 |
| LPC  | 1 |   |   |   | 5 |   |   |   | 9 |    | 11 | 12 | 13 | 15 |

METHOD AND SYSTEM FOR IMPLEMENTING A WAVEFORM VIEWER

CROSS-REFERENCE TO RELATED APPLICATIONS

This application claims the benefit of U.S. Provisional Application No. 60/702,056 filed Jul. 21, 2005, which is hereby incorporated by reference in its entirety.

TECHNICAL FIELD

The invention relates to electronic design automation (EDA) tools, and more specifically to systems and methods for accessing and viewing waveforms.

BACKGROUND AND SUMMARY

EDA tools, such as a circuit simulator, are critical aspects of the modern circuit design process. The design process is a highly interactive process where the designer uses, for example, the simulator to explore a given circuit design and to ensure that the design will function adequately for its intended purpose.

To maximize the effectiveness and efficiency of the design process, it is important that the interactive exploration process of circuit design be as efficient and as natural as possible. Therefore, an effective EDA tool should allow the circuit designer to easily determine the effect of various design parameters and component values on a circuit, as well as any changes to those values.

To represent and visualize the behavior of a circuit design, the circuit simulator or other EDA tool will often generate one or more waveforms that correspond to the circuit. Waveforms may be used to describe many types of properties and characteristics of a circuit design. In many cases, particularly for the design of analog or mixed analog-digital circuits, waveforms provide the best and most efficient visual indication of the behavior of the circuit design.

One potential problem is that with modern circuit simulators, each waveform or set of waveforms could potentially correspond to a very large quantity of underlying data. This underlying data could include a massive amount of information relating to the many coordinate points along the waveform paths. Given this large quantity of data, a significant amount of system resources and overhead may be required by conventional tools to access and view the waveforms. Such overhead could include, for example, the network traffic, IO resources, and disproportionate amount of time needed to transfer the data from the EDA tool or other storage location for the waveform data and to render the waveform on the device being used by a user to view the waveform. This introduces excessively unproductive delays with conventional waveform viewers between the time a user selected a waveform or a portion of a waveform to be viewed and the time the selected waveform is actually displayed for viewing.

This document describes an improved system and method for handling and displaying waveform data. While the present document describes embodiments in which the waveforms are generated from a simulation tool, it is noted that the present invention is not limited to being used in conjunction just EDA tools, and may be used in conjunction with any source of waveforms, such as for example, waveforms that are measured and recorded from operation of a physical circuit. Other and additional objects, features, and advantages of the invention are described in the detailed description, figures, and claims.

BRIEF DESCRIPTION OF THE DRAWINGS

FIG. 7 illustrates a method for storing waveform data, in accordance with an embodiment of the invention.

DETAILED DESCRIPTION

This document describes an improved system and method for handling and displaying waveform data. A waveform is segmented into a plurality of segments, and data describing each segment is stored at several levels of resolution. When a user wishes to view a portion of the waveform, the appropriate segments of the waveform are identified, and the appropriate levels of resolution are selected. The data describing the appropriate segments at the appropriate levels of resolution are output to a waveform viewer. An index may be provided to aid in selection of the appropriate data. Various methods for compression of the data are also supported.

Figure 1:
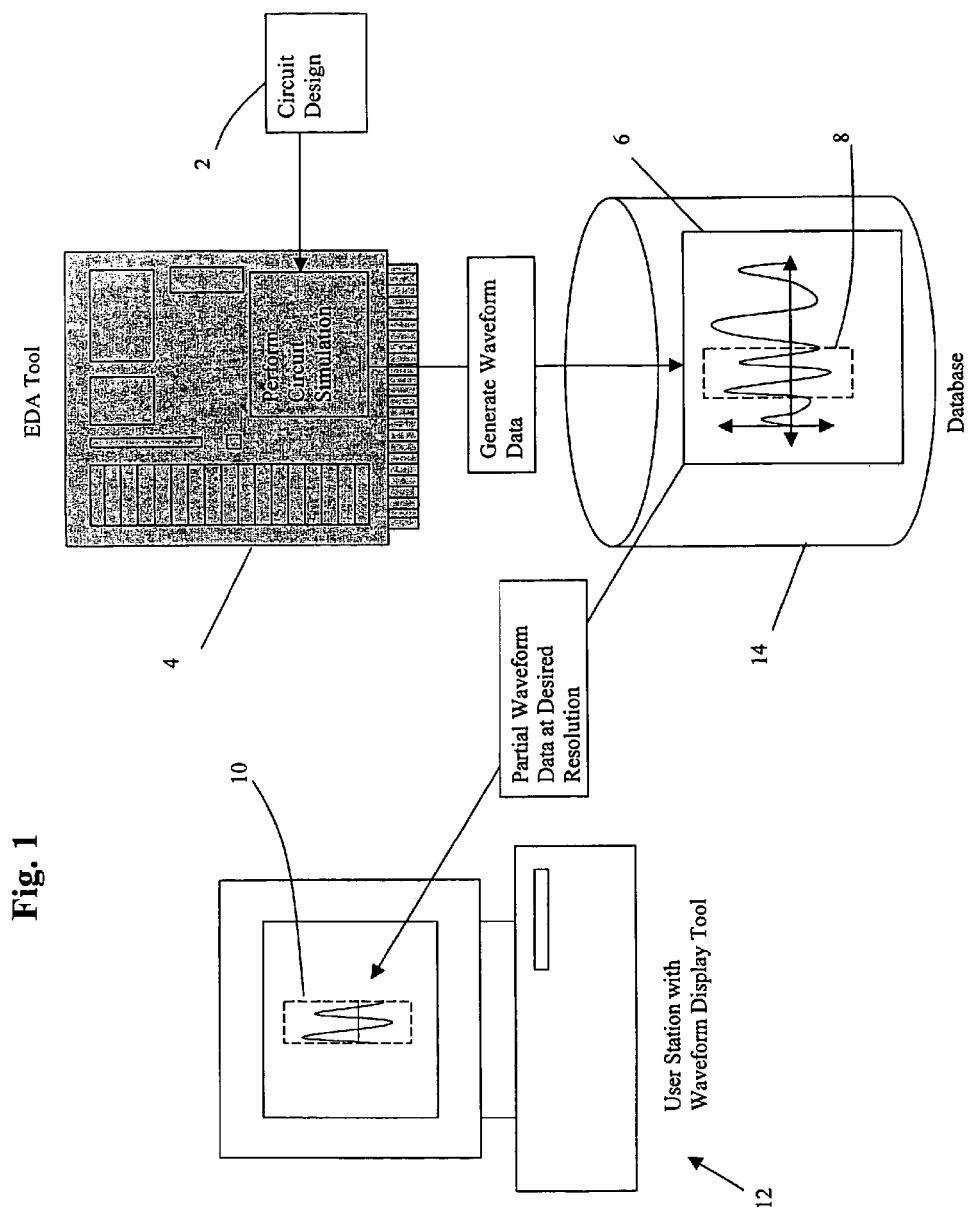
FIG. 1 is a block diagram illustrating an example system architecture for displaying waveforms, according to an embodiment of the invention.

FIG. 1 shows an example system architecture for displaying waveforms according to some embodiments of the invention. To generate the waveform data, an EDA tool 4 receives a circuit design 2, e.g., from a circuit design tool. The EDA tool 4 performs circuit simulation upon the circuit design 2 to generate waveform data 6, which is stored in database 14. Any conventional circuit simulation tool may be used in conjunction with the invention.

At a user station 12, a waveform viewer 10 is used to view the waveform. Generally, the entire set of waveform data is usually too voluminous to fit on the display area of the waveform viewer 10. The display area of the waveform viewer has only a limited number of pixels available to display waveform, which is defined by the dimensions and pixel resolution of the viewing window of the waveform viewer 10. Given the limited viewing area, in many cases, the waveform viewer 10 may view either a greater part of the overall waveform at a low resolution, or a more limited portion of the overall waveform at a higher resolution. The waveform viewer 10 may be controlled by a user to display all or part of the overall waveform. The user may zoom in or out to view the full or partial waveform at different levels of resolution.

In the example shown in FIG. 1, the waveform viewer 10 is displaying only a portion shown in the dashed box 8 of the entire waveform data 6. Therefore, the portion of the waveform data 6 outside of the dashed box 8 is not being used and displayed in the waveform viewer 10. Moreover, if the waveform data for the portion within the dashed box 8 is stored at a higher resolution than what can actually be displayed within the waveform viewer 10, then the excess waveform data 6 beyond the displayable resolution of the waveform viewer 10 is also not being used and displayed.

In short, it is likely that only a limited portion of the entire waveform data 6 may be displayed at any moment in time in the waveform viewer 10. In particular, it is not required to send the entirety of the voluminous waveform data to the user station when only a small subset of the waveform data can be displayed. Therefore, according to some embodiments, if the viewable resolution of the waveform in the waveform viewer is low, then only low-resolution waveform data should be provided to the waveform viewer. There would be no need to send the higher-resolution data to the waveform viewer since it will not be displayed. Similarly, if the user desires to view only a portion of the waveform in the waveform viewer, then data for the unviewed portions of the waveform need not be sent to the waveform viewer.

According to some embodiments of the invention, provided is a multi resolution data model for representing and accessing waveforms. Given the limited amount of waveform data that can be displayed at any moment in time in the waveform viewer 10, it is more efficient to manage, store, and access the waveform data in a way in which the system minimizes the access and transfer of excessive data beyond what is actually needed for display. Therefore, in some embodiment, waveforms are stored in multiple segments and at multiple levels of resolution. At each level except the lowest, the min/max envelope of the waveform is stored. When a waveform is requested, the request includes the identifier of the desired waveform along with the needed range and resolution. The system will then access only the segments and levels of resolution that are necessary to construct the requested waveform. This generally provides substantially greater performance for displayed waveforms because one would not need to access both all the segments and all the levels of resolution. If one is zoomed out and so viewing the entire waveform, all the segments would be needed but only the very top levels of resolution. If one were zoomed in, more levels of resolution are needed, but fewer segments.

In one embodiment, the different ways of storing waveform data are referred to as "semantics." The waveform data for the presently described approach is treated as a semantic type comprising a header and a value table. The semantic defines how the waveforms are written to a value table. In the present embodiment, the waveform data is written to separate stream files. There are multiple stream files, each containing no more than one level of resolution in the data, though a single level of resolution may be contained in multiple stream files. It is noted that either a single file, or multiple files, may be employed within the scope of the invention.

Different levels of abstraction may be employed in the present embodiment. One level of abstraction may correspond to index tables to the set of data comprising the entire waveform. This level of abstraction manages data for indexing and look-up as well as understanding the global view of the data. Another level of abstraction is at the "compressor" level. This level of abstraction understands vector segments, and sometimes groups of segments. Yet another level of abstraction is the "coder" level, which writes and reads data from storage. This level of abstraction may employ a set of interfaces for reading and writing data and understands symbols and sends them to the channel (the stream files). In addition, this level of abstraction could provide further coding to achieve compression using standard techniques such as Huffman coding, Zlib, arithmetic coding, etc. Data may be output from the coder as a heterogeneous stream. The interface to the coder level may include methods for writing a bit, and integer, a symbol, Golomb coding an integer, or otherwise inputting data.

Figure 2:
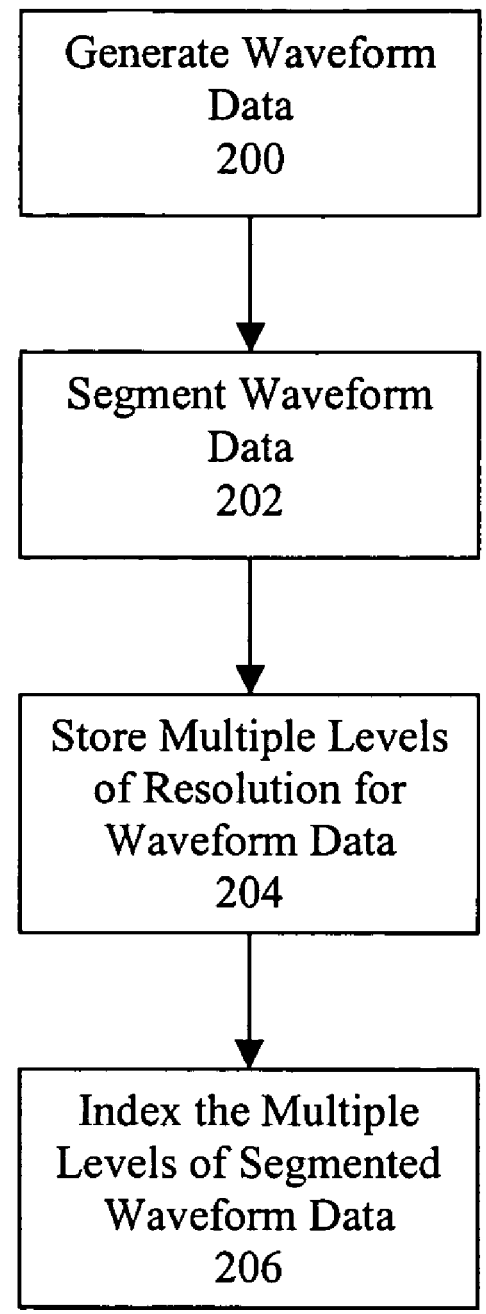
FIG. 2 is a flowchart illustrating a method for storing waveform data, in accordance with an embodiment of the invention.

FIG. 2 shows a flowchart of one embodiment of the invention. In step 200, waveform data is generated, e.g., by a circuit simulation tool. Any suitable circuit simulation tool may appropriately be used to generate the waveform data.

Figure 3:
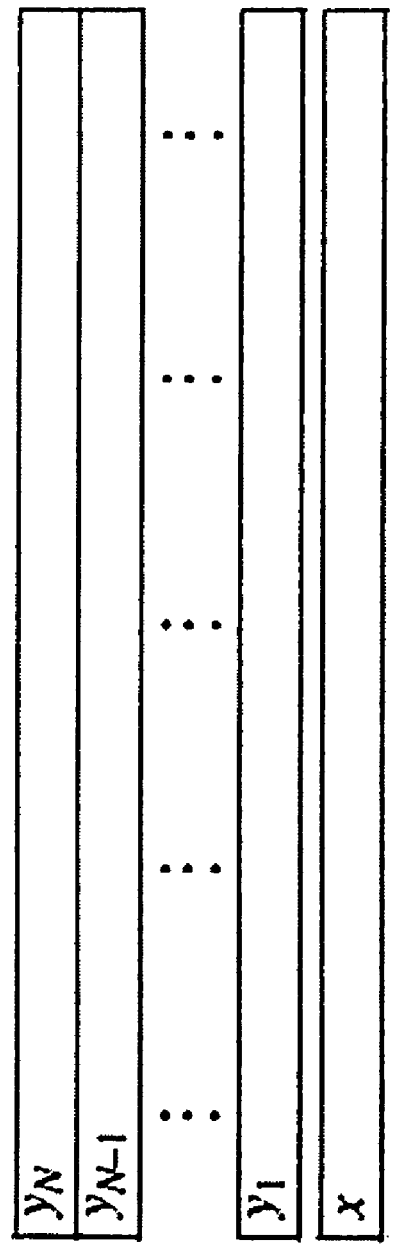
FIG. 3 illustrates a data structure in which waveform data may be stored, in accordance with an embodiment of the invention.
Figure 4:
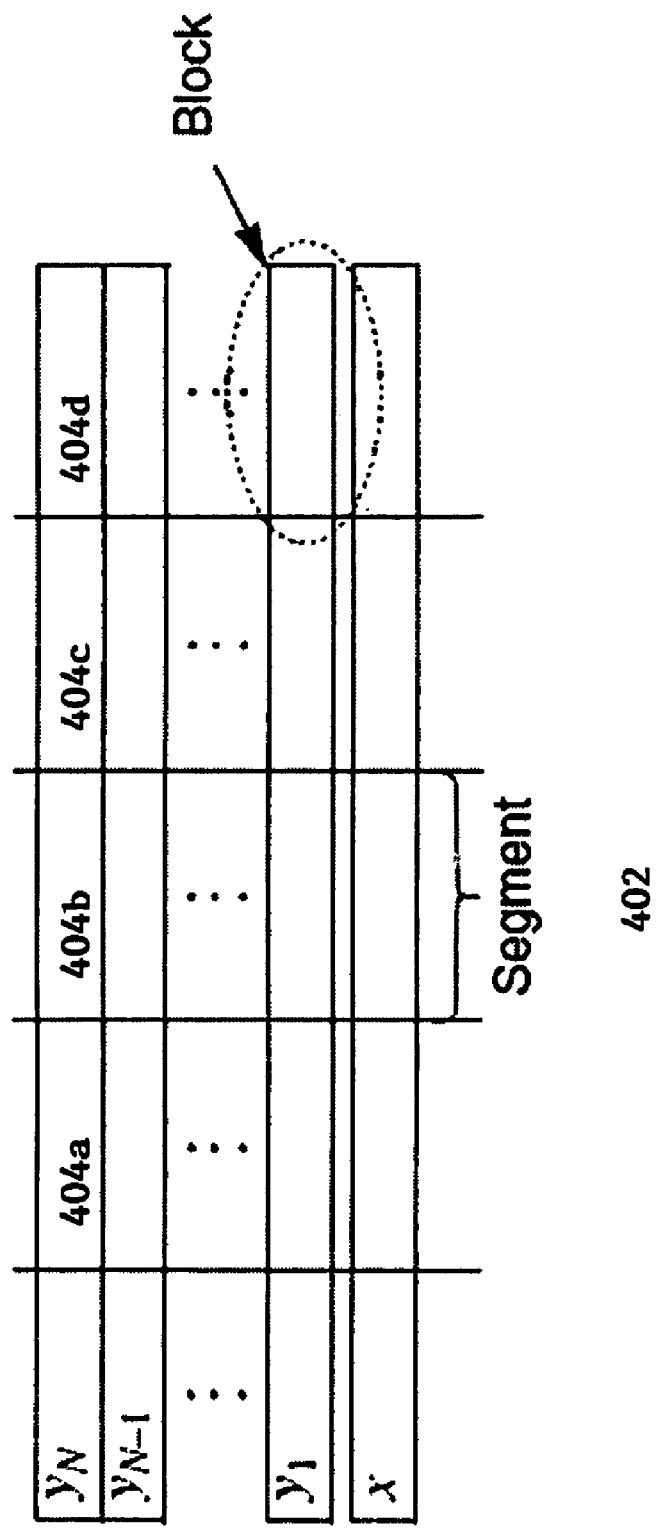
FIG. 4 illustrates a data structure in which waveform data may be stored, in accordance with an embodiment of the invention.

In step 202, The waveform data is segmented to break the entire set of waveform data into smaller portions. Examples of segmenting the data are shown in FIGS. 3-4. Referring to FIG. 3, the waveforms, which are vectors of pairs, are organized 300 such that there is a single shared abscissa vector. The system and method provides either an $xy_n$ vector pair, or just the x axis. It can also provide the same data for a restricted range of the x axis. Although FIG. 3 shows only one x-axis, in alternate implementations, multiple x-axes may be used. For example, each $y_n$ may have its own x-axis, or several $y_n$ may share an x-axis.

Referring to FIG. 4, the x axis can be further partitioned into segments, and these segments partition each vector into blocks, such as vector $y_N$ is partitioned into blocks 404a-d. As shown in FIG. 4, a segment 402 is a column of blocks. In one embodiment, the segment size is independently chosen; and the memory buffer can be considerably smaller than the segment size. Once the buffer is full of data, it is sent to the data file in the form of a segment. Then the buffer is cleared and the writing process begins filling it again. Depending upon the amount of waveform data, e.g., for million point waveforms, the segment size can be chosen so that there are thousands (or more) points in a segment and thousands or less segments.

Referring back to FIG. 2, in step 204, the next action is to compress and/or store multiple levels of resolution for some or all of the segments of the waveform data. A compressor mechanism can be employed to perform compression and storage of multiple resolution levels. In one embodiment, there are four implementations of the compressor level:

LPC. Linear predictive coding.
MR. Multi resolutional.
IMR. Irregular multi resolutional.
MM-IMR. Min/max irregular multi resolutional.

These implementations can be built on each other. Therefore, all four implementations can be configured to use LPC. IMR is a improved version of MR, and MM-IMR adds min/max envelopes on top of IMR.

Some embodiments may be implemented with Singular Value Decomposition (SVD) coding, which could provide a reduction in file size (e.g., at 5× size). SVD coding could be layered on top of, for example, IMR. In other embodiments, SVD coding may not be used.

The LPC level is a level that performs linear predictive coding on the signals. As such, it looks at past values to predict the next value. Using the actual next value, this approach computes the residual (the prediction error), quantizes it, and sends the quantized value to the coder. If the waveform is smooth, the residuals will be smaller than the actual values, so fewer bits are needed to encode them with the same level of accuracy. More information regarding an approach to implement LPC can be found in Khalid Sayood, Introduction to Data Compression (second edition), Morgan-Kaufmann Publishers, 2000, which is hereby incorporated by reference in its entirety.

In the multi-resolutional compressor levels, IMR and MR, the points in the y-vectors are partitioned into those that are included in the next higher level of representation and those that are not. Those that are not are passed through LPC on their way to the coder. Those that are in the next higher level of representation are recursively partitioned again. The MR level hierarchically decomposes the signal in terms of its index while IMR hierarchically decomposes it in terms of time. Depending upon the specific implementation of the invention, IMR may give better results than MR because of the variation in the size of a timestep. Time vectors are coded losslessly (any error in the time values is very noticeable).

In MR, the decomposition into higher levels is done in terms of the signal point index. For example, the next higher level of representation may consist of all the even points in the signal.

Figure 5:
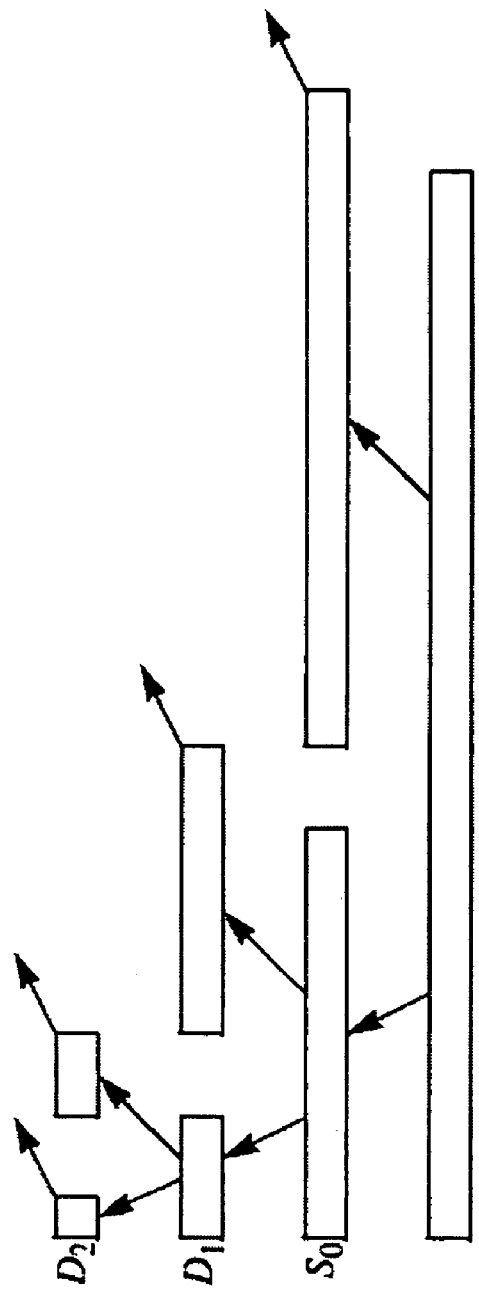
FIG. 5 illustrates a method for storing waveform data, in accordance with an embodiment of the invention.

Referring to FIG. 5, in IMR, the points in the vector are partitioned into those that are included in the next higher level of representation and those that are not.

They are partitioned as follows:

First choose a time interval $\Delta T_0 = T/N$ where T is the length of a segment and N is a number such as for example 16 or 64.

Construct $S_0$ as an array of indices such that no time value is more than $\Delta T_0$ away from either its predecessor or successor unless separation in the original points is larger than $\Delta T_0$, but the distance of each point from its predecessor is the maximal possible to the satisfy the spacing constraint.

Then construct $S_1$ so that no time value is more than $\Delta T_1 = T/N_2$ away from its neighbors, again choosing the maximally spaced points as in construction of $S_0$.

Form $D_1$ by removing $S_0$ from $S_f$. $S_0$ and $D_1$ are arrays of indices. There are also corresponding real arrays with the corresponding time values.

Continue recursively to produce $D_2$, $D_3$, etc. until there are no further points. It is noted that the resolution is decreased, $N_2 = N*$(some number, e.g. 2-6), N3=N2* (some number again) etc.

Golomb code the differences in the index values in these index vectors ($S_0, D_1, D_2, \ldots$). Real vectors are written to the output files directly or passed to further compression e.g. LPC.

Each level of resolution ($S_0, D_1, D_2, \ldots$) is assigned its own coder in one embodiment, meaning that the levels will each be in separate files (though there may be more than one file per level)—although they do not need to be in separate files.

Each coder can write out its current state in such a way that when read back in it will be returned to its current state. Thus, this may be as simple as resetting the coder. Saving the state provides the ability to perform random access on the waveforms. The state of each coder is written after each block.

Figure 6:
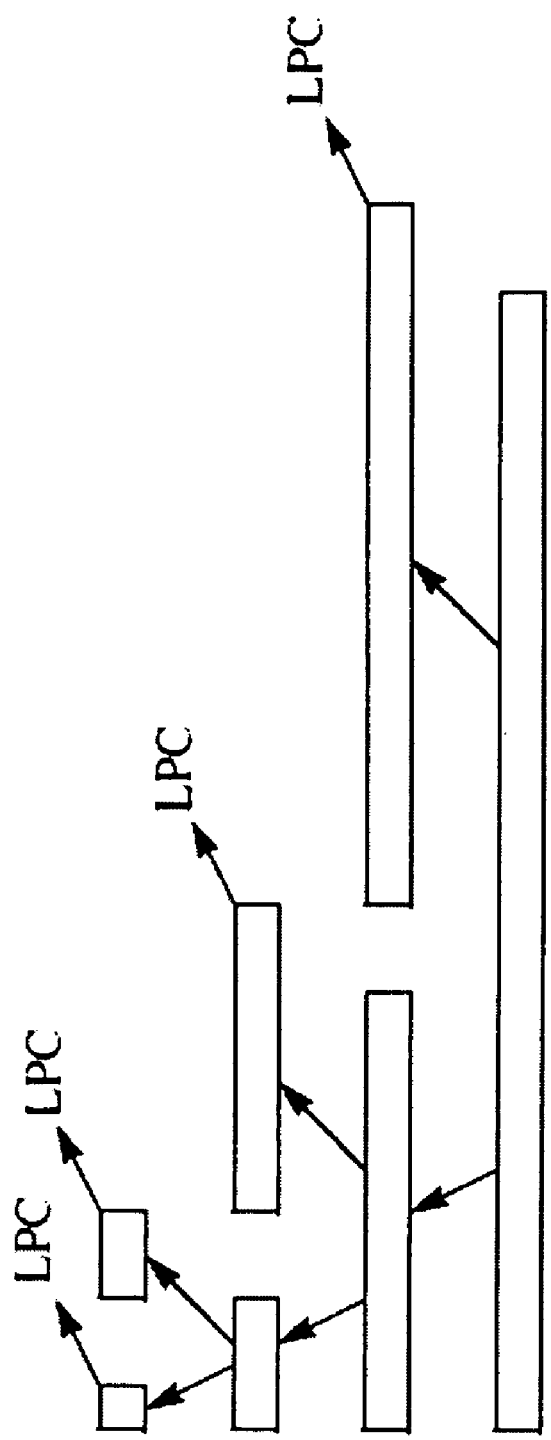
FIG. 6 illustrates a method for storing waveform data, in accordance with an embodiment of the invention.

As shown in FIG. 6, data vectors in the IMR approach 600 would be handled similar to time vectors except that after partitioning into the different resolution levels, they would be passed through lossy compression consisting of LPC coding and quantization. For MM-IMR, one tree will be built for the maximums, and one for the minimums. In this approach, the lowest level is all points not considered minimums or maximums. These points are LPC coded and are shared between both trees.

For example, consider points in $S_n$. Referring to FIG. 7, each adjacent pair of points represents an interval of points at the next lower level. The process finds the minimum and maximum points over this interval and record their indices (e.g., Golomb code the offsets from the index at the beginning of the interval). Then, the process removes the minimum and maximum points (e.g., move them to their respective trees) and LPC code what is left. Then, the process is repeated for $S_{n-1}$.

Compression, e.g., lossless compression or entropy coding, can further be used to compress the data for each resolution level for each segment. Any suitable compression scheme/mechanism can be employed.

Referring back to FIG. 2, the next action is to index the segmented and multiple levels of resolution waveform data in step 206. Any appropriate indexing structure may be used to index the different sets of waveform data. The index data allows the system to identify and access the appropriate waveform data for the required resolution level to be displayed at the waveform viewer.

In one embodiment, the following three types of queries for the indexing file may be employed:

Time Resolution. Tagged to the time segment

Coder State. Tagged to a block

Block Metadata. For example, number of points in a segment (to support downstream memory allocation).

With respect to caching, in one embodiment, there is an unbounded amount of memory dedicated to a data cache that consists of index information and the LPC data (data after LPC decode). In an alternate embodiment, the cache size is bounded.

In some embodiments, timing simulation data would be handled in the same way Spice data is handled, except that there would be multiple abscissa vectors. Because of the min/max data, the time information is not shared between the various signals except at the lowest level of representation.

This cost could be reduced further by partitioning time interval and recording absolute values at fixed intervals, which is the master time axis that is shared between all partitions. For each time partition, the process codes the difference between the time values used in the partition and the nearest master time point. In this way, only a few digits (e.g., 5) would be used to encode time, rather than the normal larger number of digits.

An explanation will now be provided regarding how the waveform viewer accesses waveform data for display. In operation the waveform tool will request a waveform over a range with a particular resolution. The system then request an estimate of the size of the resulting array. The array is allocated the system then reads only enough levels and segments to fill the array, which it does and returns it for display.

Figure 8:
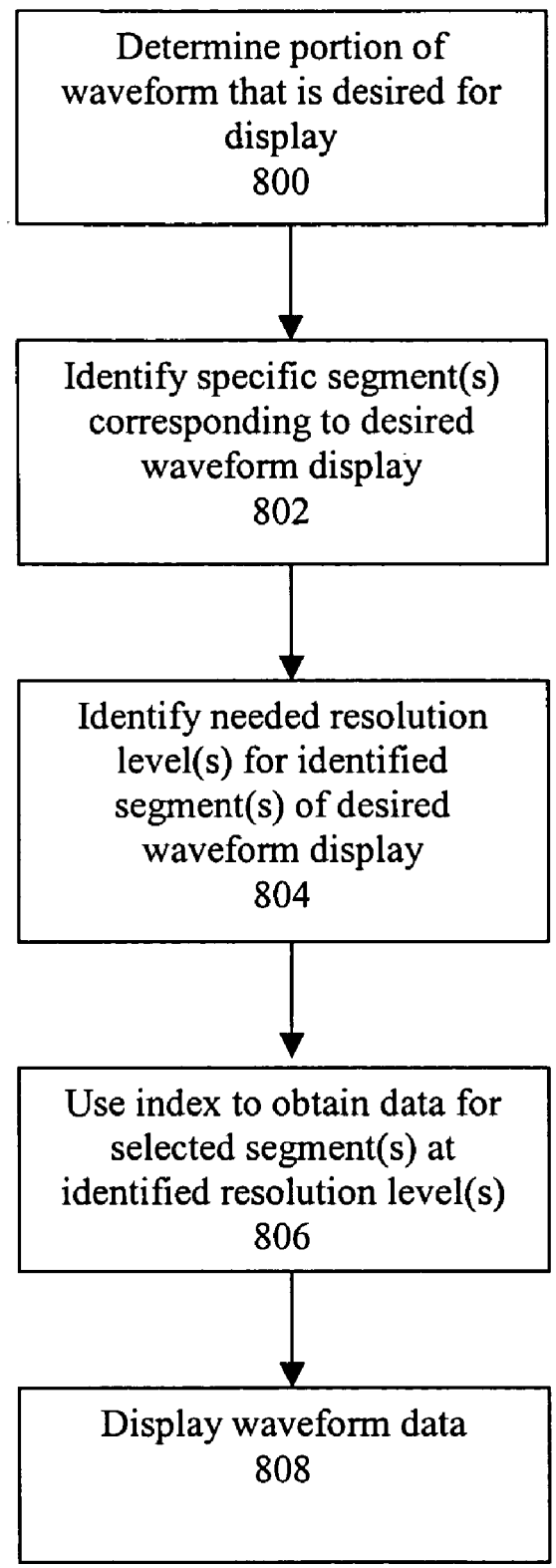
FIG. 8 is a flowchart illustrating a method for accessing waveform data, in accordance with an embodiment of the invention.

FIG. 8 shows a flowchart of a process for accessing waveform data for display at a waveform viewer, according to some embodiments of the invention. In step 800, a determination is made of the portion of the waveform that is desired for display. This action may be performed under the control of a user, by identifying the particular part of the waveform that can be displayed in the display area of a waveform viewer at a selected level of magnification/zoom for that display area.

The portion of the waveform that is to be viewed is used to determine which segments of the waveform data are desired for viewing in step 802. If the user desires to view the entire waveform (which likely means the waveform is being viewed at a very low resolution and magnification level), then the displayed waveform could correspond to all segments of the waveform data. If, however, the user only desires to view a small portion of the waveform (at a more zoomed in or magnified view), then that viewed portion may correspond to only a small number of segments of the waveform data.

The number of viewable pixels in the waveform viewer and the number of selected segments is used to determine the required resolution level for the waveform data in step 804. For example, when zoomed into a small portion of the waveform, the selected segments will be viewed at a higher resolution since more points along the waveform can be displayed within the number of pixels in the viewing are. In contrast, when viewing a larger portion of the waveform, the selected segments will be viewed at a lower resolution since a smaller number of points can be viewed within the viewable number of pixels in the display area.

The index is then used to identify and access the specific data items to be retrieved and transmitted for viewing at the waveform viewer in step 806. If the data has been compressed, then it is decompressed prior to be displayed. If data for multiple resolution levels are needed, then the data for the multiple resolution levels are combined to form the displayable data. The data for the multiple segments are then displayed on the waveform viewer.

If the user zooms in to magnify the displayed portion of the waveform, then additional data at higher resolution levels may be retrieved for viewing. In one embodiment, a cache is maintained of the prior raw data for the different segments and resolution levels prior to being processed for display. Caching the prior raw data allows that prior data to more easily be processed with new data that is retrieved to facilitate display of the zoomed in portion of the waveform.

SYSTEM ARCHITECTURE OVERVIEW

Figure 9:
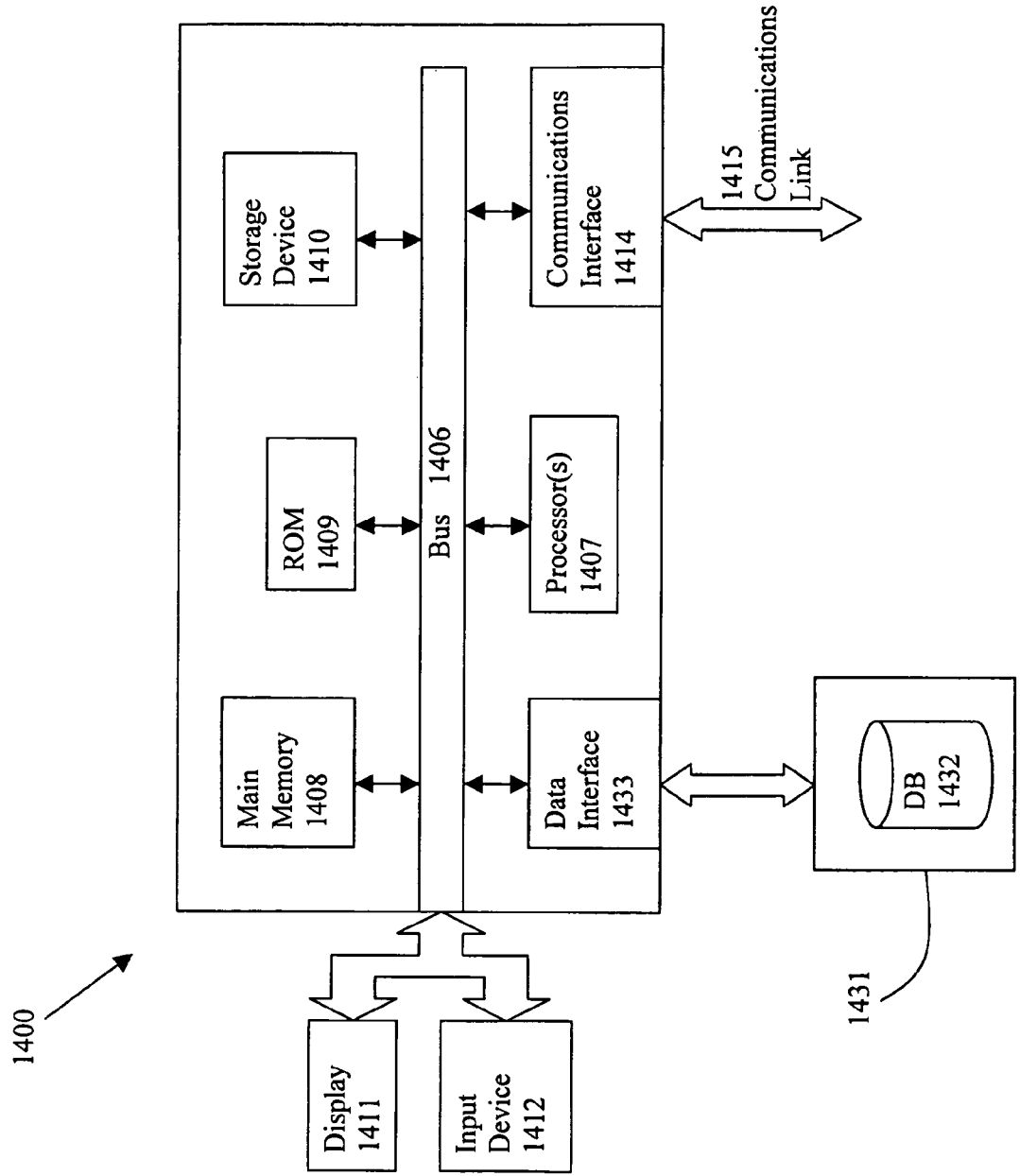
FIG. 9 is a block diagram illustrating a computer system in which embodiments of the invention may be implemented.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method of storing waveform data, comprising:
   using a computer system which comprises at least one processor and is programmed for performing:
   receiving waveform data;
   segmenting the waveform data into a plurality of segments;
   for at least one of the plurality of segments at a plurality of levels of resolution which comprise a level of higher resolution and a level of lower resolution,
      identifying or determining a first set of one or more segment data blocks and a second set of one or more segment data blocks which respectively provide a description or representation of a waveform display of the at least one of the plurality of segments at the level of lower resolution and at the level of higher resolution, wherein
      one of the first set and the second set is transmitted to a requester selected to represent or describe the waveform display of at least a part of the at least one of the one or more segments in response a request from the requester for the waveform display at a desired level of resolution without transmitting other data blocks of the waveform data that do not describe or represent the at least the part of the at least one of the one or more segment at the desired level of resolution to the requester, and
      both the first set and the second set are made available to represent or describe the waveform display of the at least a part of the at least one of the one or more segments at different levels of resolution; and
   storing the waveform data by storing the first set and the second set of one or more segment data blocks in a computer readable storage medium or a computer storage device.

2. The method of claim 1, wherein the waveform data is generated by a circuit simulation tool.

3. The method of claim 1, wherein each segment data block comprises a header and a value table.

4. The method of claim 1, wherein each segment data block comprises a stream file.

5. The method of claim 1, wherein each segment data block describes a segment at one level of resolution.

6. The method of claim 1, further comprising:
   performing data compression prior to storing the segment data blocks.

7. The method of claim 6, wherein performing data compression comprises:
performing linear predictive coding.

8. The method of claim 6, wherein performing data compression comprises:
performing multi-resolutional compression, comprising:
hierarchically decomposing the waveform data in terms of an index, the decomposition consisting of selecting data whose indices differ by a given value.

9. The method of claim 6, wherein performing data compression comprises:
performing irregular multi-resolutional compression, comprising:
hierarchically decomposing the waveform data in terms of time.

10. The method of claim 9, wherein hierarchically decomposing the waveform data in terms of time comprises:
separating a first group of data points from other data points in the waveform data, wherein the first group of data points comprises:
one or more data points separated by one or more maximal spacings less than or equal to a predetermined spacing.

11. The method of claim 6, wherein performing data compression comprises:
performing min/max irregular multi resolutional compression, comprising:
hierarchically decomposing the waveform data in terms of time;
creating a first tree for including a plurality of maxima from the waveform data;
creating a second tree including a plurality of minima from the waveform data; and
sharing points that are neither maxima nor mimima between the first tree and the second tree.

12. The method of claim 11, wherein the first tree and the second tree each comprise data indices of the waveform data.

13. The method of claim 12, wherein the data indices are stored by differences and -compressed.

14. The method of claim 1, further comprising:
indexing the segment data blocks.

15. The method of claim 14, wherein indexing the segment data blocks comprises:
performing time resolution indexing.

16. The method of claim 14, wherein indexing the segment data blocks comprises:
performing coder state indexing.

17. The method of claim 14, wherein indexing the segment data blocks comprises:
performing block metadata indexing.

18. A computer implemented method for accessing waveform data for display at a waveform viewer, comprising:
using a computer system which comprises at least one processor and is programmed for performing:
receiving information indicating a portion of a waveform to be displayed, wherein
the waveform to be displayed is segmented into a plurality of segments,
at least one of the plurality of segments corresponds to a first set and a second set of one or more segment data blocks which respectively provide a description or representation of a waveform display of the at least one of the plurality of segments at a level of lower resolution and at a level of higher resolution of a plurality of levels of resolution for a display of the waveform,
one of the first set and the second set is transmitted to a requester to represent or describe the waveform display of at least a part of the at least one of the one or more segments in response a request from the requester for the waveform display at a desired level of resolution without transmitting other data blocks of the waveform data that do not describe or represent the at least the part of the at least one of the one or more segment at the desired level of resolution to the requester, and
both the first set and the second set are made available to represent or describe the waveform display of the at least a part of the at least one of the one or more segments at different levels of resolution;
identifying the at least one of the plurality of segments corresponding to the portion of the waveform;
identifying one or more resolution levels from the plurality of levels of resolution for the at least one of the plurality of segments based at least in part on a characteristic of the at least one of the plurality of segments, wherein the act of identifying one or more resolution levels is performed by a processor;
outputting data describing the at least one of the plurality of segments at the one or more resolution levels, wherein the second set is not used for the act of outputting the data describing the at least one of the plurality of segments at the lower resolution level; and
displaying a representation of the data on a display apparatus or storing the representation of the data on a computer readable storage medium or a computer storage device of the computer system.

19. The method of claim 18, wherein the one or more resolution levels are identified based on the number of pixels in the waveform viewer.

20. The method of claim 18, further comprising:
using an index to obtain data for the identified segments at the identified resolution levels.

21. The method of claim 18, wherein outputting data comprises:
outputting one or more segment data blocks, each segment data block describing an identified segment at an identified resolution.

22. The method of claim 21, wherein each segment data block comprises a stream file.

23. The method of claim 18, further comprising:
performing decompression on the data prior to outputting the data.

24. The method of claim 18, further comprising:
combining data from multiple resolution levels prior to outputting the data.

25. A system for storing waveform data, comprising:
a computer system which comprises at least one processor and is programmed for performing:
receiving waveform data;
segmenting the waveform data into a plurality of segments; and
for at least one of the plurality of segments at a plurality of levels of resolution which comprise a level of higher resolution and a level of lower resolution,
identifying or determining a first set of one or more segment data blocks and a second set of one or more segment data blocks which respectively provide a description or representation of a waveform display of the at least one of the plurality of segments at the level of lower resolution and at the level of higher resolution, wherein
one of the first set and the second set is transmitted to a requester to represent or describe the waveform display of at least a part of the at least one of the one or more segments in response a request from the requester for the waveform display at a desired level of resolution without transmitting other data blocks of the waveform data that do not describe or represent the at least the part of the at least one of the one or more segment at the desired level of resolution to the requester, and both the first set and the second set are made available to represent or describe the waveform display of the at least a part of the at least one of the one or more segments at different levels of resolution; and storing the waveform data by storing the first set and the second set of one or more segment data blocks in a computer readable storage medium or a computer storage device.

26. The system of claim 25, in which the computer system is further programmed or configured for at least:

performing data compression prior to storing the segment data blocks; and performing linear predictive coding.

27. The system of claim 26, in which the computer system programmed for performing the data compression is further programmed or configured for at least:

performing multi-resolutional compression by at least hierarchically decomposing the waveform data in terms of an index or in terms of time, wherein the decomposition comprises selecting data whose indices differ by a given value.

28. The system of claim 27, wherein the computer system programmed or configured for hierarchically decomposing the waveform data in terms of time is further programmed or configured for:

separating a first group of data points from other data points in the waveform data, in which the first group of data points comprises one or more data points separated by one or more maximal spacings less than or equal to a predetermined spacing.

29. The system of claim 26, in which the computer system configured or programmed for performing the data compression is further configured or programmed for at least:

performing min/max irregular multi resolutional compression, comprising:

hierarchically decomposing the waveform data in terms of time;

creating a first tree for including a plurality of maxima from the waveform data;

creating a second tree including a plurality of minima from the waveform data; and sharing points that are neither maxima nor minima between the first tree and the second tree.

30. An article of manufacture comprising a tangible computer readable storage medium which comprises software executable which, when executed by a computer system, causes the computer system to perform a process for storing waveform data, the process comprising:

using the computer system which comprises at least one processor and is programmed for performing:

receiving waveform data;

segmenting the waveform data into a plurality of segments;

for at least one of the plurality of segments at a plurality of levels of resolution which comprise a level of higher resolution and a level of lower resolution, identifying or determining a first set of one or more segment data blocks and a second set of one or more segment data blocks which respectively provide a description or representation of a waveform display of the at least one of the plurality of segments at the level of lower resolution and at the level of higher resolution, wherein one of the first set and the second set is transmitted to a requester to represent or describe the waveform display of at least a part of the at least one of the one or more segments in response a request from the requester for the waveform display at a desired level of resolution without transmitting other data blocks of the waveform data that do not describe or represent the at least the part of the at least one of the one or more segment at the desired level of resolution to the requester, and both the first set and the second set are made available to represent or describe the waveform display of the at least a part of the at least one of the one or more segments at different levels of resolution; and storing the waveform data by storing the first set and the second set of one or more segment data blocks in a computer readable storage medium or a computer storage device.

31. The article of manufacture of claim 30, the process further comprising:

performing data compression prior to storing the segment data blocks; and performing linear predictive coding.

32. The article of manufacture of claim 31, in which the process for performing the data compression further comprises:

performing multi-resolutional compression by at least hierarchically decomposing the waveform data in terms of an index or in terms of time, wherein the decomposition comprises selecting data whose indices differ by a given value.

33. The article of manufacture of claim 32, in which the process for hierarchically decomposing the waveform data in terms of time further comprises:

separating a first group of data points from other data points in the waveform data, in which the first group of data points comprises one or more data points separated by one or more maximal spacings less than or equal to a predetermined spacing.

34. The article of manufacture of claim 31, in which the process for performing the data compression further comprises:

performing min/max irregular multi resolutional compression, comprising:

hierarchically decomposing the waveform data in terms of time;

creating a first tree for including a plurality of maxima from the waveform data;

creating a second tree including a plurality of minima from the waveform data; and sharing points that are neither maxima nor minima between the first tree and the second tree.

35. A system for accessing waveform data for display at a waveform viewer of a display apparatus, comprising:

a computer system which comprises at least one processor and is programmed for performing:

receiving information indicating a portion of a waveform to be displayed, wherein the waveform to be displayed is segmented into a plurality of segments, at least one of the plurality of segments corresponds to a first set and a second set of one or more segment data blocks which respectively provide a description or representation of a waveform display of the at least one of the plurality of segments at a level of lower resolution and at a level of higher resolution of a plurality of levels of resolution for the waveform display, one of the first set and the second set is transmitted to a requester to represent or describe the waveform display of at least a part of the at least one of the one or more segments in response a request from the requester for the waveform display at a desired level of resolution without transmitting other data blocks of the waveform data that do not describe or represent the at least the part of the at least one of the one or more segment at the desired level of resolution to the requester, and both the first set and the second set are made available to represent or describe the waveform display of the at least a part of the at least one of the one or more segments at different levels of resolution;

identifying the at least one of the plurality of segments corresponding to the portion of the waveform;

identifying one or more resolution levels from the plurality of levels of resolution for the at least one of the plurality of segments based at least in part on a characteristic of the at least one of the plurality of segments;

outputting data describing the at least one of the plurality of segments at the one or more resolution levels, wherein the second set is not used for the act of outputting the data describing the at least one of the plurality of segments at the lower resolution level; and displaying a representation of the data on a display apparatus or storing the representation of the data in a computer readable storage medium or a computer storage device of the computer system.

36. The system of claim 35, the computer system is further configured or programmed for at least:
using an index to obtain data for the identified segments at the identified resolution levels.

37. The system of claim 35, the computer system is further configured or programmed for at least:
identifying a semantic for the at least one of the plurality of segments;
identifying or generating a first stream file for the level of lower resolution and a second stream file for the level of higher resolution for the at least one of the plurality of segments based at least in part upon the semantic; and
using at least the first stream file and the second stream file for the act of outputting the data.

38. The system of claim 37, in which the computer system is further programmed or configured for at least:
identifying or generating a third stream file for the level of lower resolution or a forth stream file for the level of higher resolution for the at least one of the plurality of segments based at least in part upon the semantic such that at least one of the level of lower resolution and the level of higher resolution is associated with multiple stream files that are used for the act of outputting the data.

39. An article of manufacture having a tangible computer readable storage medium having stored thereupon a sequence of instructions which, when executed by at least one processor of a computing system, causes the at least one processor to perform a process for accessing waveform data for display at a waveform viewer of a display apparatus, the process comprising:
using a computer system which comprises at least one processor and is programmed for performing:
receiving information indicating a portion of a waveform to be displayed, wherein
the waveform to be displayed is segmented into a plurality of segments,
at least one of the plurality of segments corresponds to a first set and a second set of one or more segment data blocks which respectively provide a description or representation of a waveform display of the at least one of the plurality of segments at a level of lower resolution and at a level of higher resolution of a plurality of levels of resolution for the waveform display,
one of the first set and the second set is transmitted to a requester to represent or describe the waveform display of at least a part of the at least one of the one or more segments in response a request from the requester for the waveform display at a desired level of resolution without transmitting other data blocks of the waveform data that do not describe or represent the at least the part of the at least one of the one or more segment at the desired level of resolution to the requester, and
both the first set and the second set are made available to represent or describe the waveform display of the at least a part of the at least one of the one or more segments at different levels of resolution;
identifying the at least one of the plurality of segments corresponding to the portion of the waveform;
identifying one or more resolution levels from the plurality of levels of resolution for the at least one of the plurality of segments based at least in part on a characteristic of the at least one of the plurality of segments, wherein the act of identifying one or more resolution levels is performed by a processor;
outputting data describing the at least one of the plurality of segments at the one or more resolution levels, wherein the second set is not used for the act of outputting the data describing the at least one of the plurality of segments at the lower resolution level; and
displaying a representation of the data on a display apparatus or storing the representation of the data on a computer readable storage medium or a computer storage device of the computer system.

40. The article of manufacture of claim 39, the process further comprises:
using an index to obtain data for the identified segments at the identified resolution levels.

41. The article of manufacture of claim 39, the process further comprises:
identifying a semantic for the at least one of the plurality of segments;
identifying or generating a first stream file for the level of lower resolution and a second stream file for the level of higher resolution for the at least one of the plurality of segments based at least in part upon the semantic; and
using at least the first stream file and the second stream file for the act of outputting the data.

42. The article of manufacture of claim 41, the process further comprises:
identifying or generating a third stream file for the level of lower resolution or a forth stream file for the level of higher resolution for the at least one of the plurality of segments based at least in part upon the semantic such that at least one of the level of lower resolution and the level of higher resolution is associated with multiple stream files that are used for the act of outputting the data.

\* \* \* \* \*

UNITED STATES PATENT AND TRADEMARK OFFICE
CERTIFICATE OF CORRECTION

| | |
|---|---|
| PATENT NO. | : 8,325,188 B1 |
| APPLICATION NO. | : 11/490838 |
| DATED | : December 4, 2012 |
| INVENTOR(S) | : Phillips et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1065 days.

Signed and Sealed this
Second Day of December, 2014

Michelle K. Lee
*Deputy Director of the United States Patent and Trademark Office*